(12) United States Patent
Heath et al.

(10) Patent No.: US 11,919,099 B2
(45) Date of Patent: Mar. 5, 2024

(54) BLADE FOR A POWER TOOL

(71) Applicant: MILWAUKEE ELECTRIC TOOL CORPORATION, Brookfield, WI (US)

(72) Inventors: Peter R. Heath, Wauwatosa, WI (US); John J. Springer, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/071,586

(22) Filed: Oct. 15, 2020

(65) Prior Publication Data

US 2021/0114125 A1 Apr. 22, 2021

Related U.S. Application Data

(60) Provisional application No. 62/923,295, filed on Oct. 18, 2019.

(51) Int. Cl.
*B23D 61/00* (2006.01)
*B25F 3/00* (2006.01)

(52) U.S. Cl.
CPC .............. *B23D 61/006* (2013.01); *B25F 3/00* (2013.01)

(58) Field of Classification Search
CPC .... B23D 61/006; B23D 65/00; B24B 45/006; B24B 23/04; B26D 7/086; B26D 7/2614; Y10T 83/9457; Y10T 83/9319; B25F 3/00; B27B 19/006; B27B 19/008; A61B 17/14; A61B 17/142; A61B 17/144
USPC ............................ 30/346.55, 357; D8/19, 20
See application file for complete search history.

(56) References Cited

U.S. PATENT DOCUMENTS

| | | | |
|---|---|---|---|
| 1,384,884 A * | 7/1921 | Beck | B23D 61/006 83/836 |
| 2,594,598 A * | 4/1952 | Timmins | A01B 1/00 294/51 |
| 3,852,881 A | 12/1974 | Treace | |
| 4,513,742 A * | 4/1985 | Arnegger | B23D 61/006 30/350 |
| 5,095,623 A | 3/1992 | Williams | |
| 5,403,318 A | 4/1995 | Boehringer et al. | |
| 5,409,491 A | 4/1995 | Boehringer et al. | |

(Continued)

FOREIGN PATENT DOCUMENTS

| | | |
|---|---|---|
| CN | 102303168 A | 1/2012 |
| CN | 104339035 A | 2/2015 |

(Continued)

OTHER PUBLICATIONS

International Search Report and Written Opinion for Application No. PCT/US2020/055776 dated Jan. 27, 2021 (7 pages).

(Continued)

*Primary Examiner* — Jason Daniel Prone
(74) *Attorney, Agent, or Firm* — Michael Best & Friedrich LLP

(57) ABSTRACT

A blade includes an attachment portion having a mounting aperture, the attachment portion configured to couple with an oscillating power tool. The blade also includes a body extending from the attachment portion in a direction defining a longitudinal axis. The body includes a cutting edge having teeth and a distal end generally opposite the attachment portion. The cutting edge is recessed from the distal end.

19 Claims, 8 Drawing Sheets

(56) References Cited

U.S. PATENT DOCUMENTS

| | | | | |
|---|---|---|---|---|
| 5,697,835 A * | 12/1997 | Nitz | ............... | B23D 61/006 30/353 |
| 6,302,406 B1 * | 10/2001 | Ventura | ............... | A61B 17/144 606/177 |
| D627,464 S * | 11/2010 | Nelson | ............... | B23D 61/006 D8/20 |
| D686,048 S * | 7/2013 | Lock | ............... | B23D 61/006 D8/20 |
| 8,499,674 B2 | 8/2013 | Holba et al. | | |
| 8,568,204 B2 * | 10/2013 | Steiger | ............... | B23D 61/006 30/353 |
| 8,734,450 B2 * | 5/2014 | Landon | ............... | A61B 17/142 30/337 |
| D706,595 S * | 6/2014 | Kaye, Jr. | ............... | A61B 17/142 D8/20 |
| 9,027,452 B2 * | 5/2015 | Nagy | ............... | B23D 61/006 30/348 |
| 9,302,405 B2 * | 4/2016 | Rubens | ............... | B23D 61/006 |
| 9,522,432 B2 * | 12/2016 | Staub | ............... | B23D 61/006 |
| 9,669,556 B2 * | 6/2017 | Nirmel | ............... | B26B 27/00 |
| 10,016,904 B2 | 7/2018 | Jones | | |
| 10,716,578 B2 * | 7/2020 | Nunan | ............... | A61B 17/144 |
| 11,376,016 B2 * | 7/2022 | Nunan | ............... | A61B 17/142 |
| D962,027 S * | 8/2022 | Beck | ............... | B23D 61/006 D8/20 |
| 2006/0123959 A1 * | 6/2006 | Bocast | ............... | B23D 61/006 83/13 |
| 2010/0262148 A1 * | 10/2010 | O'Donoghue | ....... | A61B 17/142 606/82 |
| 2011/0046627 A1 * | 2/2011 | Kim | ............... | A61B 17/142 606/82 |
| 2012/0311876 A1 | 12/2012 | Zhang | | |
| 2013/0160631 A1 * | 6/2013 | Nagy | ............... | B23D 61/006 83/835 |
| 2014/0082948 A1 | 3/2014 | Staub | | |
| 2014/0230626 A1 * | 8/2014 | Puzio | ............... | B23D 61/006 83/697 |
| 2014/0345148 A1 * | 11/2014 | Kaye, Jr. | ............... | B26D 1/0006 30/356 |
| 2015/0273706 A1 | 10/2015 | Martin | | |
| 2016/0257010 A1 | 9/2016 | Jones | | |
| 2019/0054552 A1 * | 2/2019 | Churchill | ............... | B23D 61/006 |
| 2019/0192170 A1 * | 6/2019 | Nunan | ............... | A61B 17/142 |
| 2019/0240752 A1 * | 8/2019 | Churchill | ............... | B23D 61/006 |
| 2020/0001494 A1 * | 1/2020 | Gisler | ............... | B23D 61/006 |
| 2020/0101543 A1 * | 4/2020 | Cloutier | ............... | B25F 3/00 |
| 2020/0375609 A1 * | 12/2020 | Miyatani | ............... | A61B 17/142 |
| 2022/0061855 A1 * | 3/2022 | Sayger | ............... | A61B 17/142 |
| 2022/0297213 A1 * | 9/2022 | Springer | ............... | B23D 61/006 |
| 2023/0044567 A1 * | 2/2023 | Springer | ............... | B23D 61/006 |

FOREIGN PATENT DOCUMENTS

| | | | | |
|---|---|---|---|---|
| CN | 104227133 B | 12/2016 | | |
| CN | 303965797 S | 12/2016 | | |
| CN | 304011577 S | 1/2017 | | |
| DE | 3915062 A1 * | 11/1989 | ............ | B23D 61/006 |
| DE | 102009030854 A1 * | 1/2011 | ............ | B23D 61/006 |
| DE | 102009050195 A1 | 4/2011 | | |
| DE | 102012201239 A1 * | 8/2013 | ............ | B23D 61/006 |
| DE | 102011103880 B4 | 8/2016 | | |
| EP | 2364806 B1 | 3/2013 | | |
| JP | 2009511150 A | 3/2009 | | |
| WO | 2008061835 A1 | 5/2008 | | |
| WO | 2013077862 A1 | 5/2013 | | |
| WO | 2013113432 A1 | 8/2013 | | |
| WO | WO-2013113432 A1 * | 8/2013 | ............ | B23D 61/006 |
| WO | WO-2021146511 A1 * | 7/2021 | ............ | B23D 61/006 |

OTHER PUBLICATIONS

Extended European Search Report for Application No. 20875986.0 dated Jun. 5, 2023 (8 pages).

* cited by examiner

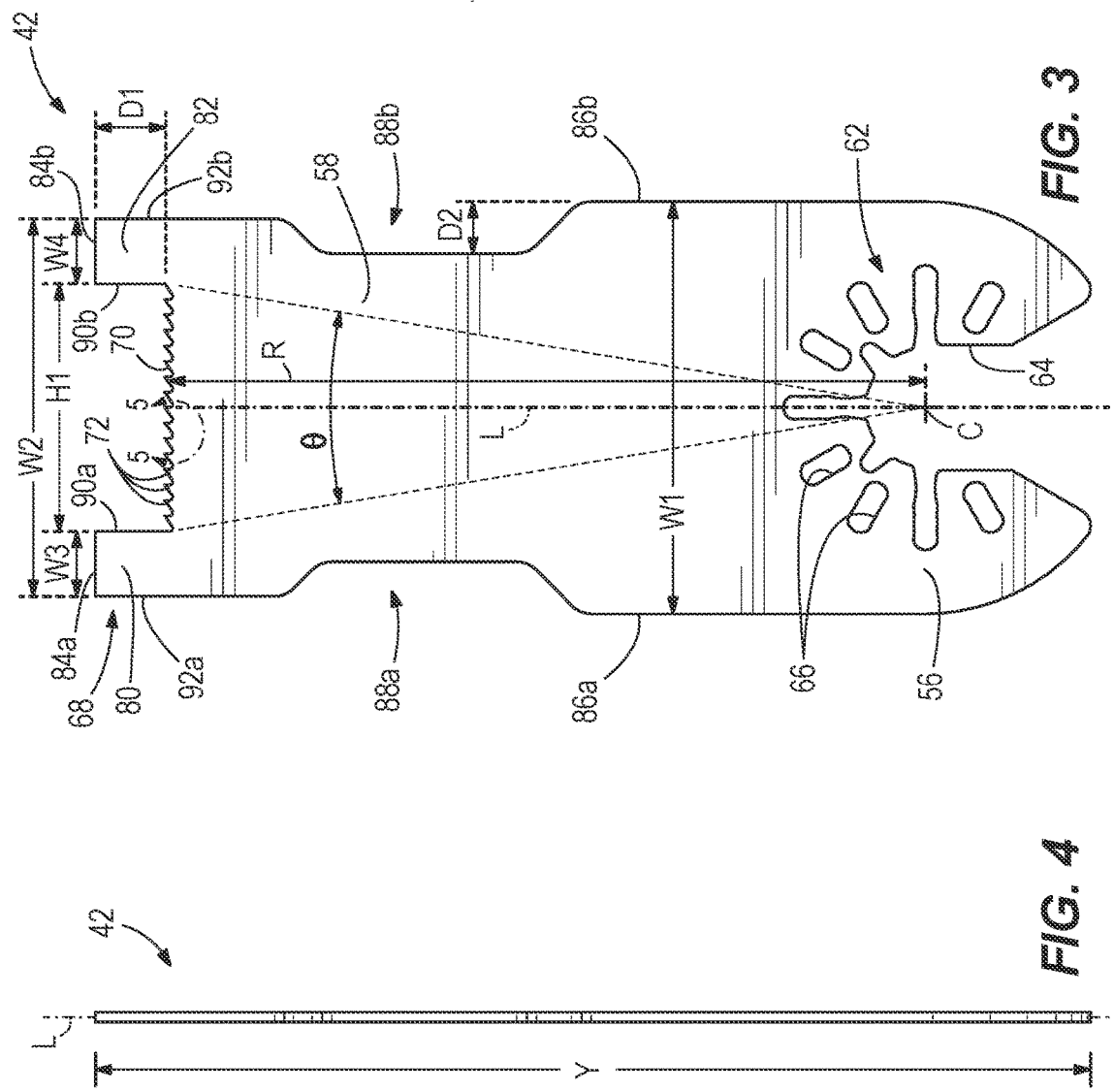

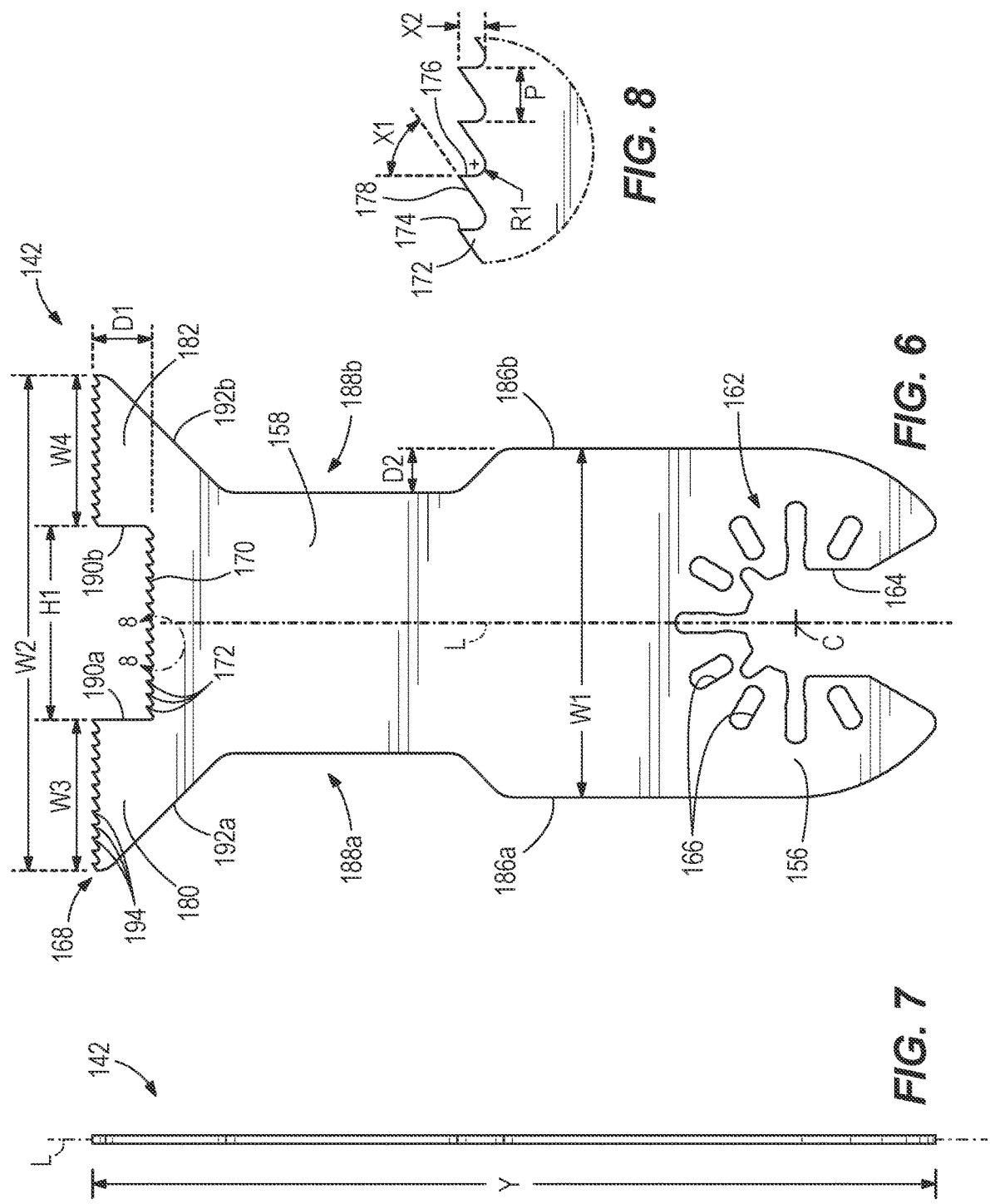

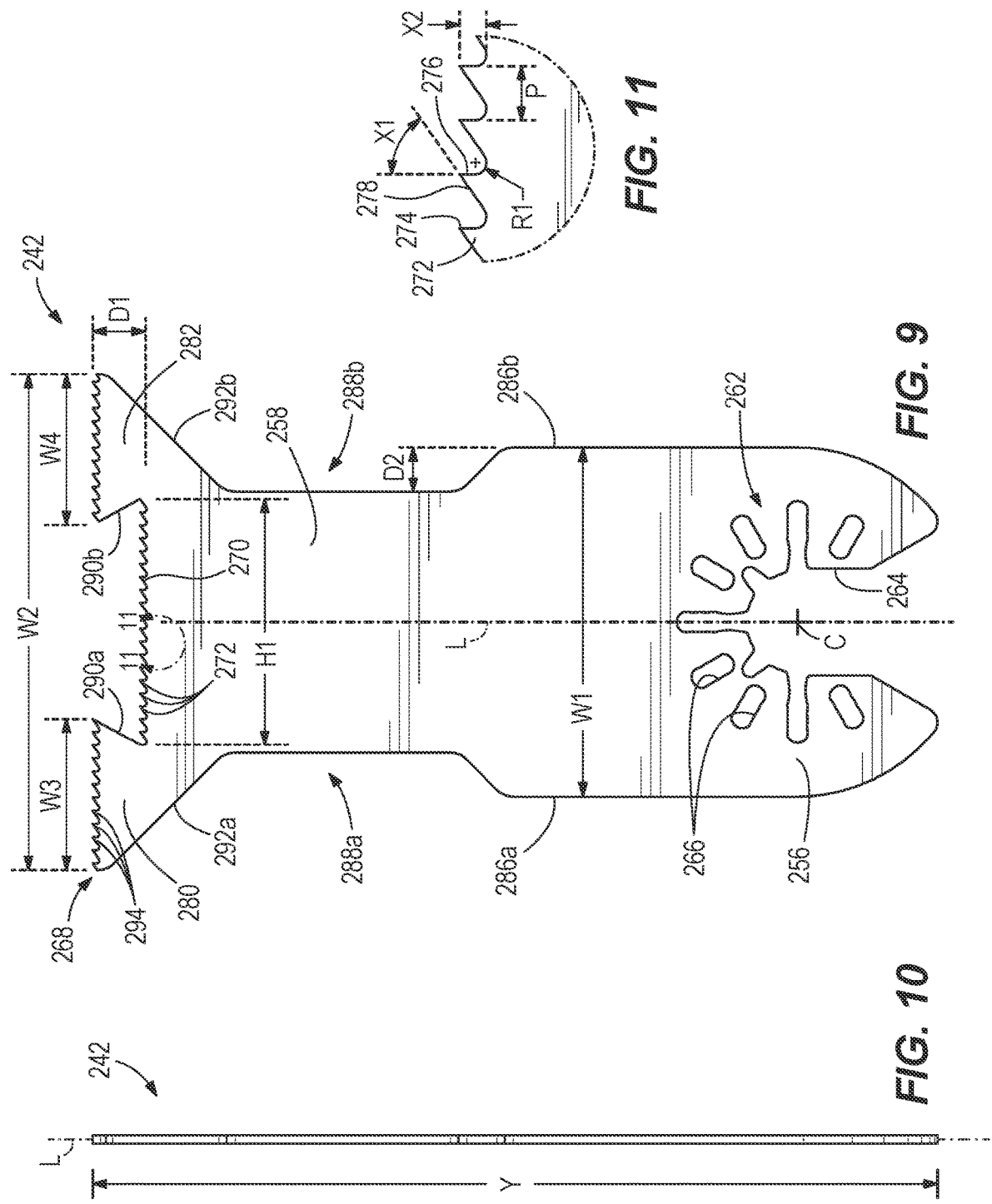

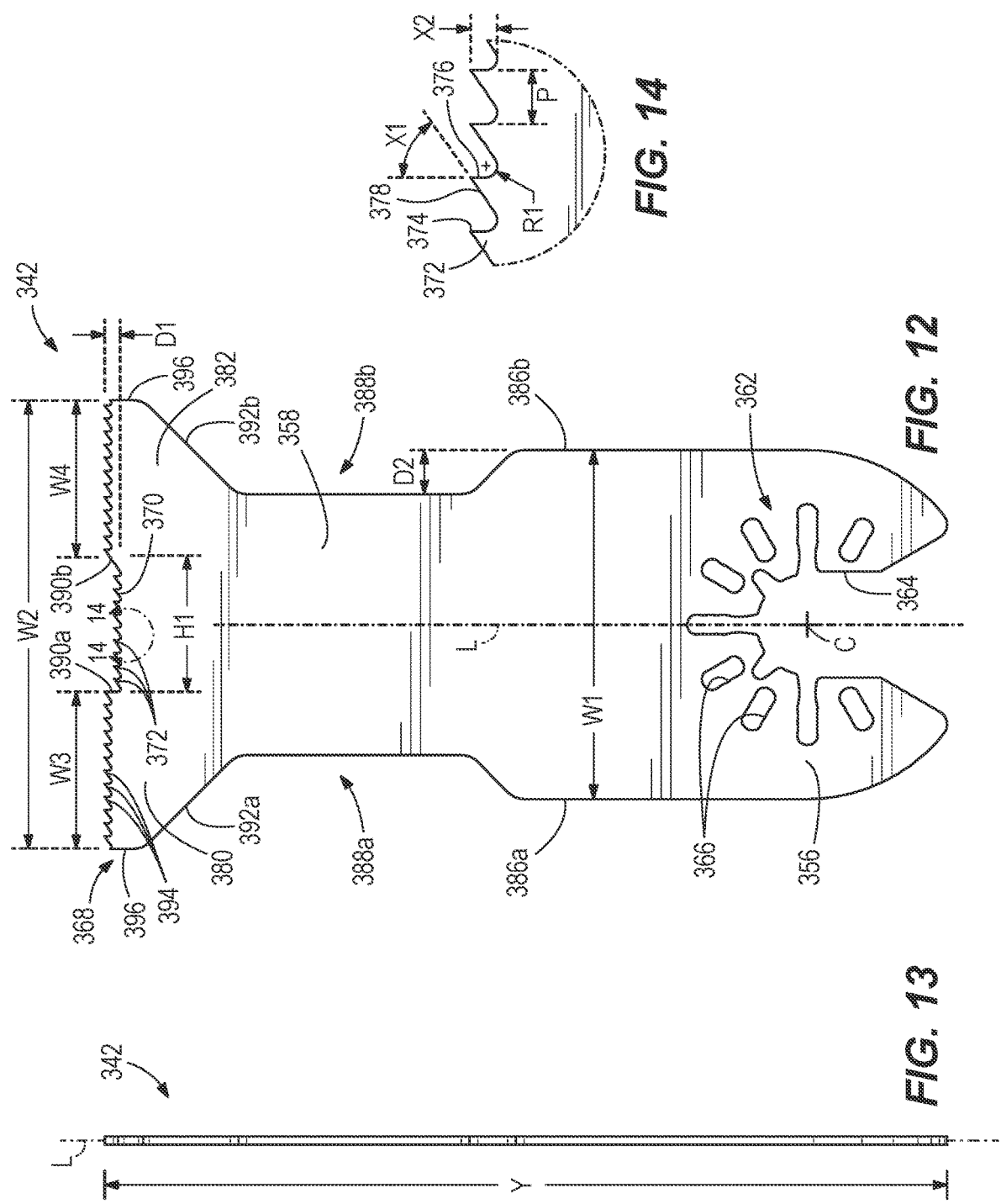

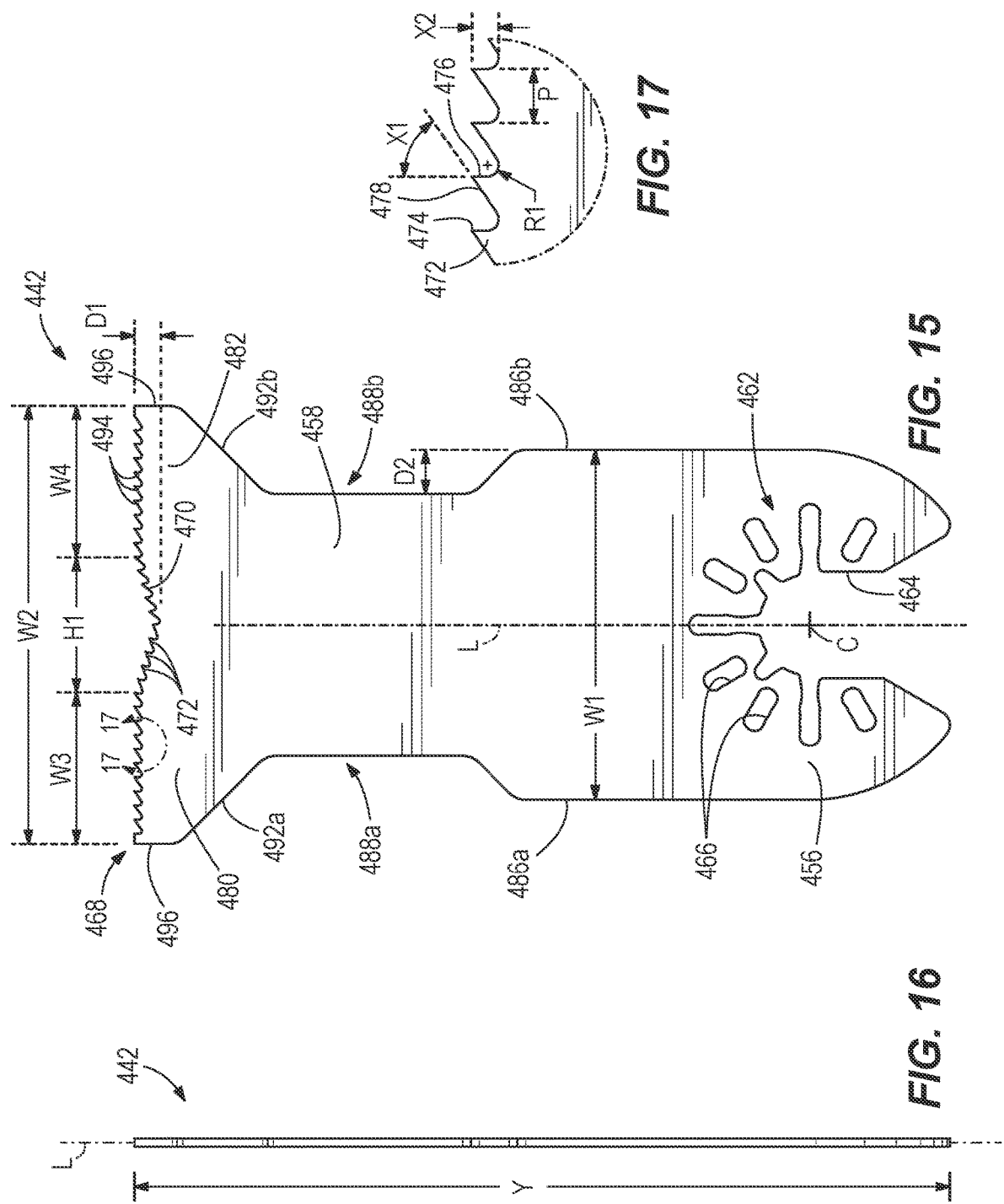

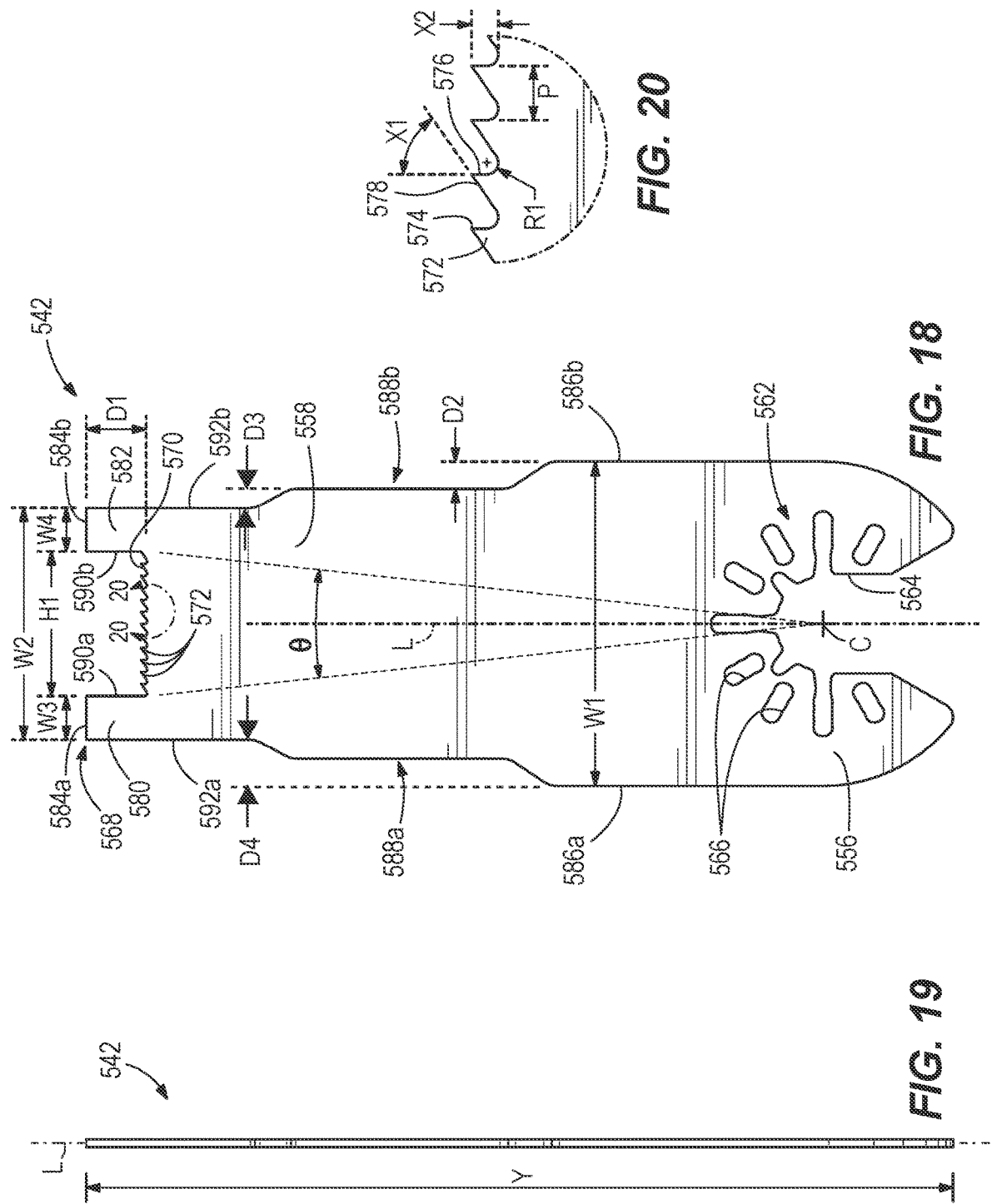

BLADE FOR A POWER TOOL

CROSS-REFERENCE TO RELATED APPLICATION

This application claims priority to U.S. Provisional Patent Application No. 62/923,295 filed on Oct. 18, 2019, the entire contents of which are incorporated herein by reference.

FIELD OF THE DISCLOSURE

The present disclosure relates to a blade for power tools, and more particularly to a blade for an oscillating power tool.

SUMMARY

In one aspect, the disclosure provides a blade including an attachment portion having a mounting aperture, the attachment portion configured to couple with an oscillating power tool. The blade also includes a body extending from the attachment portion in a direction defining a longitudinal axis. The body includes a cutting edge having teeth and a distal end generally opposite the attachment portion. The cutting edge is recessed from the distal end.

In another aspect, the disclosure provides a blade including an attachment portion having a mounting aperture, the attachment portion configured to couple with an oscillating power tool. The blade also includes a body extending from the attachment portion in a forward direction defining a longitudinal axis, the body including a cutting edge having teeth and a distal end generally opposite the attachment portion. The teeth extend from a first end of the cutting edge to a second end of the cutting edge. A first toothless wall extends in the forward direction from the first end of the cutting edge toward the distal end, and a second toothless wall extends in the forward direction from the second end of the cutting edge toward the distal end.

In another aspect, the disclosure provides a blade including an attachment portion having a mounting aperture, the attachment portion configured to couple with an oscillating power tool. The blade also includes a body extending from the attachment portion in a direction defining a longitudinal axis, the body including a distal end generally opposite the attachment portion. The distal end includes teeth. The body includes a toothed notch recessed from the distal end.

In another aspect, the disclosure provides a blade for use with an oscillating power tool. The blade includes an attachment portion and a body extending from the attachment portion in a direction defining a longitudinal axis. The attachment portion includes a mounting aperture arrangement configured to couple with the oscillating power tool. The body includes a distal end generally opposite the attachment portion, and a working edge having teeth. The working edge is recessed from the distal end.

The teeth extend generally perpendicular to the longitudinal axis. The distal end is defined by a first stop on one side of the working edge and a second stop on the other side of the working edge. The first and second stops each include an inner wall extending from the working edge to the distal end. The inner wall is toothless. In some implementations, at least one of the inner walls is substantially parallel with the longitudinal axis. In other implementations, at least one of the inner walls is transverse to the longitudinal axis. The first and second stops each include an outer wall extending from the distal end toward the attachment portion on an outer side of the body. The outer wall is toothless. In some implementations, the outer wall is substantially parallel to the longitudinal axis. In other implementations, the outer wall is transverse to the longitudinal axis. In some implementations, the distal end is toothless. In other implementations, the distal end is toothed.

In another aspect, the disclosure provides a blade for use with an oscillating power tool. The blade includes an attachment portion and a body extending from the attachment portion in a direction defining a longitudinal axis. The attachment portion includes a mounting aperture arrangement configured to couple with the oscillating power tool. The body includes a distal end generally opposite the attachment portion having teeth. The body includes a toothed notch recessed from the distal end.

The toothed notch has a V-shape converging towards the attachment portion. The body has side recesses defined in side edges extending generally parallel to the longitudinal axis.

Other aspects of the disclosure will become apparent by consideration of the detailed description and accompanying drawings.

BRIEF DESCRIPTION OF THE DRAWINGS

FIG. 3 is a top view of a blade attachable to the oscillating power tool of FIG. 1 according to one implementation of the disclosure.

FIG. 4 is a side view of the blade shown in FIG. 3.

FIG. 5 is a detail view of a portion of the blade shown in FIG. 3.

FIG. 6 is a top view of a blade attachable to the oscillating power tool of FIG. 1 according to another implementation of the disclosure.

FIG. 7 is a side view of the blade shown in FIG. 6.

FIG. 8 is a detail view of a portion of the blade shown in FIG. 6.

FIG. 9 is a top view of a blade attachable to the oscillating power tool of FIG. 1 according to another implementation of the disclosure.

FIG. 10 is a side view of the blade shown in FIG. 9.

FIG. 11 is a detail view of a portion of the blade shown in FIG. 9.

FIG. 12 is a top view of a blade attachable to the oscillating power tool of FIG. 1 according to another implementation of the disclosure.

FIG. 13 is a side view of the blade shown in FIG. 12.

FIG. 14 is a detail view of a portion of the blade shown in FIG. 12.

FIG. 15 is a top view of a blade attachable to the oscillating power tool of FIG. 1 according to another implementation of the disclosure.

FIG. 16 is a side view of the blade shown in FIG. 15.

FIG. 17 is a detail view of a portion of the blade shown in FIG. 15.

FIG. 18 is a top view of a blade attachable to the oscillating power tool of FIG. 1 according to another implementation of the disclosure.

FIG. 19 is a side view of the blade shown in FIG. 18.

FIG. 20 is a detail view of a portion of the blade shown in FIG. 18.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. The terms "substantially" and "generally" may be used herein to encompass "exactly" and "approximately". The terms "walls" and "edges" may be defined interchangeably herein.

Figure 1:
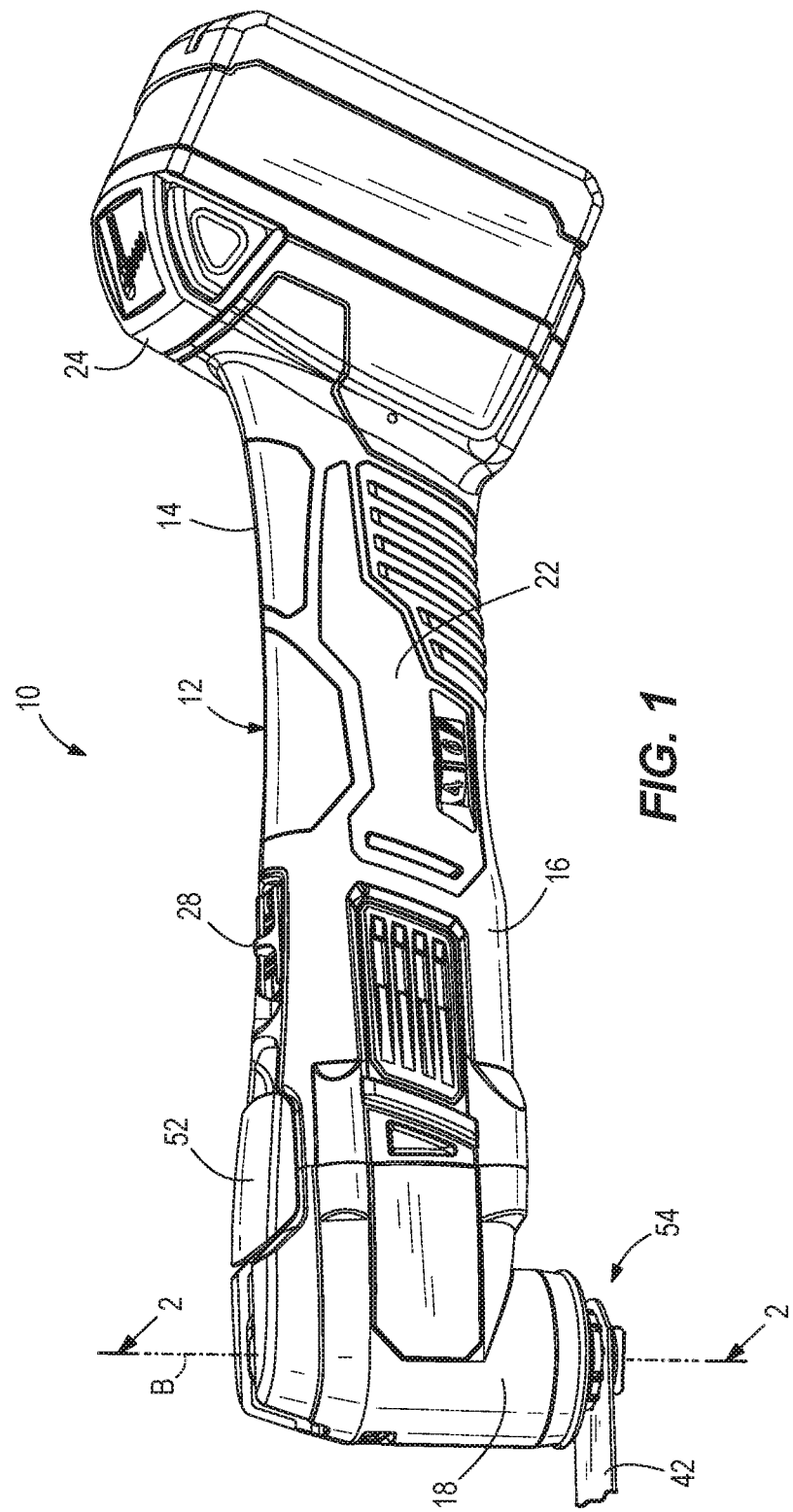
FIG. 1 is a side perspective view of an oscillating power tool for receiving interchangeable working tools, such as blades.

FIG. 1 illustrates a power tool 10 according to one implementation of the disclosure. The power tool 10 includes a main body 12 having a housing 14 defining a handle 16 and a head 18. The head 18 is driven by a motor 20 (FIG. 2) disposed within the housing 14. The handle 16 includes a grip portion 22 providing a surface suitable for grasping by an operator to operate the power tool 10. The housing 14 generally encloses the motor 20.

The motor 20 in the illustrated implementation is an electric motor driven by a power source such as a battery pack 24 (FIG. 1), but may be powered by other power sources such as an AC power cord in other implementations. In yet other implementations, the power tool 10 may be pneumatically powered or powered by any other suitable power source and the motor 20 may be a pneumatic motor or other suitable type of motor. The motor 20 includes a motor drive shaft 26 (FIG. 2) extending therefrom and driven for rotation about a motor axis A. The motor 20 may be a variable speed or multi-speed motor. In other implementations, other suitable motors may be employed.

The battery pack 24 (FIG. 1) is a removable and rechargeable battery pack. In the illustrated implementation, the battery pack 24 may include a 12-volt battery pack, a 14.4-volt battery pack, an 18-volt battery pack, or any other suitable voltage, and includes Lithium-ion battery cells (not shown). Additionally or alternatively, the battery cells may have chemistries other than Lithium-ion such as, for example, Nickel Cadmium, Nickel Metal-Hydride, or the like. In other implementations, other suitable batteries and battery packs may be employed.

The main body 12 also includes a power actuator 28 (FIG. 1). The power actuator 28 is movably coupled with the housing 14 and is actuatable to power the motor 20, e.g., to electrically couple the battery pack 24 and the motor 20 to run the motor 20. The power actuator 28 may be a sliding actuator as shown, or in other implementations may include a trigger-style actuator, a button, a lever, a knob, etc.

Figure 2:
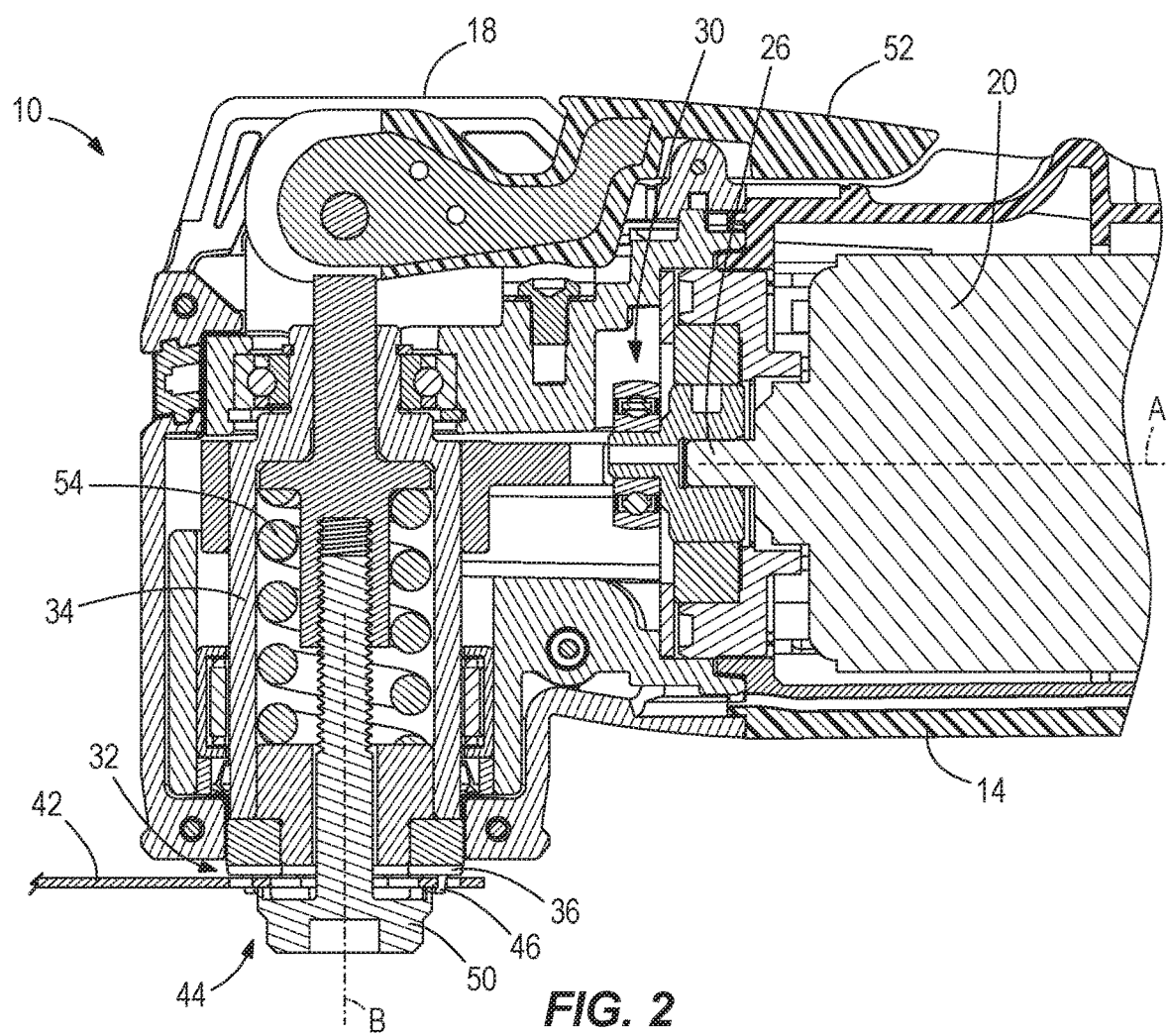
FIG. 2 is a side view cross-section of a head portion of the oscillating power tool of FIG. 1 taken through lines 2-2 in FIG. 1.

The housing 14 also houses a drive mechanism 30 (FIG. 2) for converting rotary motion of the motor drive shaft 26 into oscillating motion of an output mechanism 32. As shown in FIG. 2, the output mechanism 32 includes a spindle 34 having an accessory holder 36 disposed at a distal end thereof. As shown in FIG. 2, the spindle 34 terminates, at a free end, with the accessory holder 36. The accessory holder 36 is configured to receive an accessory, such as a blade 42, and a clamping mechanism 44 (FIG. 2) clamps the blade 42 to the accessory holder 36. Specifically, the accessory holder 36 includes a first locating feature 46, such as a protrusion or protrusions sized and shaped for receiving the blade 42. The clamping mechanism 44 includes a clamping flange 50 at a distal end thereof for clamping the blade 42 to the accessory holder 36 for oscillating motion with the spindle 34. A clamping actuator 52, such as a lever, is configured to apply and release a clamping force from a biasing member 54, such as a spring. The spindle 34 defines an oscillation axis B, substantially perpendicular to the motor axis A, about which the spindle 34 oscillates, as will be described in greater detail below. In other implementations, other clamping actuators may be employed, such as a button, a knob, etc.

FIGS. 3-5 illustrate the blade 42 according to one implementation of the disclosure. The blade 42 is preferably formed from metal, which may include a metal, a metal alloy, a bi-metal, or any combination of metals, metal alloys, bi-metals, etc. For example, the metal may include hardened steel, carbide, etc. The blade 42 may be formed from other materials in other implementations. The blade 42 includes an attachment portion 56 and a body 58 extending from the attachment portion 56 along a longitudinal axis L in a fixed manner with respect to the attachment portion 56. The blade 42 is generally planar (as shown in the side view of FIG. 4) such that the attachment portion 56 and the body 58 generally extend in a single plane, though slight deviations from a plane may exist. In other implementations, the body 58 may be offset from the attachment portion 56 in different planes, which may be generally parallel. In such an implementation, the body 58 lies in one plane, the attachment portion 56 lies in a different plane, and a stepped portion connects the attachment portion 56 to the body 58.

The attachment portion 56 includes a mounting aperture arrangement 62 including a central aperture 64 and a plurality of peripheral apertures 66 not in communication with the central aperture 64. The attachment portion 56 is configured to engage with the clamping mechanism 44 to securely and releasably connect the blade 42 to the oscillating tool 10. The central aperture 64 may be open, e.g., a slot, as shown in the illustrated implementation. In other implementations, the central aperture 64 may be a closed aperture. The central aperture 64 defines an anchor center C and is configured such that the anchor center C intersects the oscillation axis B, about which the blade 42 is configured to oscillate rotatingly, when attached to the oscillating tool 10. The blade 42 defines the longitudinal axis L disposed generally perpendicular to the oscillation axis B, the longitudinal axis L also intersecting the anchor center C and extending from the attachment portion 56 through the body 58.

The body 58 includes a distal end 68 defined by first and second stops 80, 82, and a working edge 70 recessed between the first and second stops 80, 82. The working edge 70 may also be referred to herein as a cutting edge 70. The first and second stops 80, 82 terminate at the distal end 68 generally opposite the attachment portion 56. In the illustrated implementation, the first and second stops 80, 82 each include a substantially straight edge 84a, 84b, respectively, at the distal end 68, though in other implementations the first and second stops 80, 82 may each include other types of edges at the distal end 68, such as a curved edge, an angled edge, a point, etc. The substantially straight edges 84a, 84b are generally parallel with the working edge 70, and are generally perpendicular to the longitudinal axis L. The substantially straight edges 84a, 84b are toothless in the illustrated implementation, but may have teeth in other implementations. The working edge 70 is disposed between the distal end 68 and attachment portion 56 with respect to the longitudinal axis L. In the illustrated implementation of FIGS. 3-5, the working edge 70 is recessed from the distal end 68 by a distance D1 of about 0.25 inches (+/−0.125 inches). The distance D1 can also be described as the offset between the working edge 70 and the straight edges 84a, 84b. In other implementations, the distance D1 may be between 0.125 and 1.0 inches. In some implementations, the distance D1 may be at least 0.125 inches. In other implementations, the distance D1 may be at least 0.25 inches. The working edge 70 may be formed from bimetal, carbide, or the like, or any combination thereof, and may be formed from the same or different type of material as the rest of the blade 42.

In the illustrated implementation of FIGS. 3-5, the first and second stops 80, 82 and the working edge 70 are generally symmetrical about the longitudinal axis L (not taking the toothform into consideration for symmetry). Other implementations need not be symmetrical. In the illustrated implementation, the working edge 70 is disposed substantially perpendicularly to the longitudinal axis L. However, in other implementations, the working edge 70 may have other orientations with respect to the longitudinal axis L. For example, the working edge 70 may be generally transverse (i.e., non-parallel) to the longitudinal axis L, which may include substantially perpendicular, angled, etc. Also in other implementations, the working edge 70 need not be straight and may be curved. In the illustrated implementation, the working edge 70 is toothed, e.g., includes teeth 72. The tooth density of the teeth 72 is 18 teeth per inch, but in other implementations the tooth density may be 14 to 24 teeth per inch. Generally, there should be at least three teeth 72 engaging the object being cut. Another way of expressing TPI is through the pitch P, which is the distance between teeth 72 when the teeth are uniform. The minimum pitch (Pmin) can be calculated by the radial distance R multiplied by the angular distance θ times pi divided by 540 (Pmin=θπ/540), where the radial distance R is measured from the anchor center C to the working edge 70, and where the angular distance θ is measured between opposite ends of the working edge 70 with the anchor center C as the angular center. In the illustrated implementation, the teeth 72 each include a pointed tip 74 defined by a first edge 76 disposed substantially parallel to the longitudinal axis L and a second edge 78 disposed at an angle X1 of about 55 degrees with respect to the longitudinal axis L (+/−5 degrees). A height X2 of the teeth 72 is about 0.016 inches (+/−0.005 inches) measured from the center of the gullet to the pointed tip 74, or about 0.0282 inches (+1-0.005 inches) measured from the bottom of the gullet to the pointed tip 74, as shown. A gullet radius R1 between each of the teeth 72 is about 0.012 (+1-0.005 inches). In other implementations, the first working edge 70 may include other types and configurations of teeth, such as other rake and relief style teeth, triangular teeth, etc. And in yet other implementations the first working edge 70 may include other types of cutting surfaces, grinding surfaces, sanding surfaces, smoothing surfaces, etc.

In the illustrated implementation of FIGS. 3-5, the working edge 70 is substantially linear. More specifically, the pointed tips 74 of the teeth 72 defining the working edge 70 are arranged substantially linearly. A horizontal linear dimension H1 of the working edge 70 measured perpendicular to the longitudinal axis L in the plane of the blade 42 is about 0.895 inches (+/−0.125 inches), but may have other dimensions in other implementations. For example, in some implementations, the horizontal linear dimension H1 may be between 0.25 inches and 2 inches. In some implementations, the horizontal linear dimension H1 may be at least 0.25 inches. In other implementations, the horizontal linear dimension H1 may be less than 2 inches.

In the illustrated implementation of FIGS. 3-5, the blade 42 includes substantially parallel linear side edges 86a, 86b extending generally parallel to the longitudinal axis L. A width W1 between the side edges 86a, 86b is about 1.490 inches (+/−0.125 inches). In other implementations, the width W1 may be between 0.6 and 3 inches. The blade 42 includes side recesses 88a, 88b disposed in the body 58 between the working edge 70 and the attachment portion 56. The side recesses 88a, 88b are recessed from the side edges 86a, 86b by a distance D2 of about 0.188 inches (+/−0.05 inches). In other implementations, the distance D2 may be between 0.005 and 0.4 inches, and in yet other implementations the side recesses need not be included. The side recesses 88a, 88b are disposed between the attachment portion 56 and the first and second stops 80, 82. The distal end 68 has an overall width W2 of about 1.365 inches (+/−0.125 inches). In other implementations, the overall width W2 may be between 0.3 and 3 inches.

The first and second stops 80, 82 each include a stop width W3, W4, respectively. The stop widths W3, W4 are about 0.235 inches (+/−0.125 inches) in the illustrated implementation, but may be between 0.1 inches and 1.25 inches in other implementations. In some implementations, each width W3, W4 may be at least 0.1 inches or may be at least 0.2 inches. In other implementations, each width W3, W4 may be less than 1.25 inches, may be less than 1.0 inches, or may be less than 0.5 inches. The stop widths W3, W4 are substantially the same as each other in the illustrated implementation, but may be different from each other in other implementations. Inner walls 90a, 90b of the first and second stops 80, 82 are substantially straight and parallel to the longitudinal axis L. The inner walls 90a, 90b are toothless and separate the working edge 70 from the distal end 68 such that the working edge 70 is disjointed from the substantially straight edges 84a, 84b. In other implementations, the inner walls 90a, 90b may have teeth. Furthermore, outer walls 92a, 92b of the first and second stops 80, 82 are substantially straight and parallel to the longitudinal axis L. The outer walls 92a, 92b are farther from the longitudinal axis L than the inner walls 90a, 90b. The first and second stops 80, 82 are each generally rectangular, as defined collectively by the substantially straight edges 84a, 84b, the inner walls 90a, 90b, and the outer walls 92a, 92b, respectively. In other implementations, the inner walls 90a, 90b and the outer walls 92a, 92b need not be parallel and may be transverse (non-parallel) to the longitudinal axis L, or any combination of parallel and transverse. Furthermore, in other implementations, the inner walls 90a, 90b and the outer walls 92a, 92b need not be straight and may be curved, or any combination of straight and curved.

With reference to FIG. 4, a length Y of the blade 42 measured parallel to the longitudinal axis L is about 3.595 inches (+/−0.125 inches). In other implementations, the length Y may be between 2 inches and 6 inches, and more specifically between 3 inches and 4 inches.

In other implementations, the blade 42 may have other dimensions, other sizes, other shapes, etc.

FIGS. 6-8 illustrate a blade 142 according to another implementation of the disclosure. The blade 142 has the same material(s) and features of the blade 42 described above except where differences are specifically described below. As such, description of the blade 42 above applies to the blade 142 and, rather than duplicate description, reference is made to the description above. Like reference numerals plus "100" are employed with respect to FIGS. 6-8 and should be understood to be supported by description of the like reference numerals described above, unless specifically described otherwise below.

The blade 142 includes a body 158 having a distal end 168 and a working edge 170 recessed from the distal end 168 between first and second stops 180, 182. The working edge 170 may also be referred to herein as a cutting edge 170. The first and second stops 180, 182 terminate at the distal end 168 generally opposite the attachment portion 156. In the illustrated implementation, the first and second stops 180, 182 each include a substantially straight edge 184*a*, 184*b*, respectively, at the distal end 168, though in other implementations the first and second stops 180, 182 may each include other types of edges at the distal end 168, such as a curved edge, an angled edge, a point, etc. The substantially straight edges 184*a*, 184*b* include teeth 194 aligned linearly tip-to-tip and having the same toothform as described above with respect to the teeth 72. The substantially straight edges 184*a*, 184*b* are generally parallel with the working edge 170, and are generally perpendicular to the longitudinal axis L. The working edge 170 is disposed between the distal end 168 and attachment portion 156 with respect to the longitudinal axis L. In the illustrated implementation of FIGS. 6-8, the working edge 170 is recessed from the distal end 68 by a distance D1 of about 0.25 inches (+/−0.125 inches). The distance D1 can also be described as the offset between the working edge 170 and the straight edges 184*a*, 184*b*. In other implementations, the distance D1 may be between 0.125 and 1.0 inches. The working edge 170 may be formed from bimetal, carbide, or the like, or any combination thereof, and may be formed from the same or different type of material as the rest of the blade 142.

In the illustrated implementation of FIGS. 6-8, the first and second stops 180, 182 and the working edge 170 are generally symmetrical about the longitudinal axis L (not taking toothform into consideration for symmetry). Other implementations need not be symmetrical. In the illustrated implementation, the working edge 170 is disposed substantially perpendicularly to the longitudinal axis L. However, in other implementations, the working edge 170 may have other orientations with respect to the longitudinal axis L. For example, the working edge 170 may be generally transverse (i.e., non-parallel) to the longitudinal axis L, which may include substantially perpendicular, angled, etc. Also in other implementations, the working edge 170 need not be straight and may be curved. In the illustrated implementation, the working edge 170 is toothed, e.g., includes teeth 172. The toothform is the same as described above with respect to the teeth 72 of the blade 42. In other implementations, the first working edge 170 may include other types and configurations of teeth, and in yet other implementations the first working edge 170 may include other types of cutting surfaces, grinding surfaces, sanding surfaces, smoothing surfaces, etc.

In the illustrated implementation of FIGS. 6-8, the working edge 170 is substantially linear. More specifically, the pointed tips 174 of the teeth 172 defining the working edge 170 are arranged substantially linearly. A horizontal linear dimension H1 of the working edge 170 measured perpendicular to the longitudinal axis L in the plane of the blade 142 is about 0.84 inches (+/−0.125 inches), but may have other dimensions in other implementations. For example, in some implementations, the horizontal linear dimension H1 may be between 0.25 inches and 2 inches.

In the illustrated implementation of FIGS. 6-8, the blade 142 includes substantially parallel linear side edges 186*a*, 186*b* extending generally parallel to the longitudinal axis L. A width W1 between the side edges 186*a*, 186*b* is about 1.490 inches (+/−0.125 inches). In other implementations, the width W1 may be between 0.6 and 3 inches. The blade 142 includes side recesses 188*a*, 188*b* disposed in the body 158 between the distal end 168 and the attachment portion 156. The side recesses 188*a*, 188*b* are recessed from the distal end 168, which has an overall width W2 of about 2.115 inches (+/−0.125 inches).

The first and second stops 180, 182 each include a stop width W3, W4, respectively. The stop widths W3, W4 are about 0.61 inches (+/−0.125 inches) in the illustrated implementation, but may be between 0.1 inches and 1.25 inches in other implementations. In some implementations, each stop width W3, W4 may be at least 0.1 inches, may be at least 0.2 inches, may be at least 0.3 inches, may be at least 0.4 inches, may be at least 0.5 inches, or may be at least 0.6 inches. In other implementations, each stop width W3, W4 may be less than 1.25 inches, may be less than 1.0 inches, or may be less than 0.75 inches. The stop widths W3, W4 are substantially the same as each other in the illustrated implementation, but may be different from each other in other implementations. Inner walls 190*a*, 190*b* of the first and second stops 180, 182 are substantially straight and parallel to the longitudinal axis L. The inner walls 190*a*, 190*b* separate the working edge 170 from the distal end 168 such that the working edge 170 is disjointed from the substantially straight edges 184*a*, 184*b*. Furthermore, outer walls 192*a*, 192*b* of the first and second stops 180, 182 are substantially straight and transverse to the longitudinal axis L. The outer walls 192*a*, 192*b* are farther from the longitudinal axis L than the inner walls 190*a*, 190*b*. Specifically, the outer walls 192*a*, 192*b* are arranged in a V-shape with respect to each other converging towards the attachment portion. The first and second stops 180, 182 are each generally triangular (specifically right triangles), as defined collectively by the substantially straight edges 184*a*, 184*b*, the inner walls 190*a*, 190*b*, and the outer walls 192*a*, 192*b*, respectively. In other implementations, the inner walls 190*a*, 190*b* need not be parallel and may be transverse (non-parallel) to the longitudinal axis L (e.g., see FIGS. 9-11 described below), or any combination of parallel and transverse. Furthermore, in other implementations, the inner walls 190*a*, 190*b* and the outer walls 192*a*, 192*b* need not be straight and may be curved, or any combination of straight and curved.

With reference to FIG. 7, a length Y of the blade 142 measured parallel to the longitudinal axis L is about 3.595 inches (+/−0.125 inches). In other implementations, the length Y may be between 2 inches and 5 inches, and more specifically between 3 inches and 4 inches.

In other implementations, the blade 142 may have other dimensions, other sizes, other shapes, etc.

FIGS. 9-11 illustrate a blade 242 according to another implementation of the disclosure. The blade 242 has the same material(s) and features of the blade 142 described above except where differences are specifically described below. As such, description of the blade 142 above applies to the blade 242 and, rather than duplicate description, reference is made to the description above. Like reference numerals plus "200" are employed with respect to FIGS. 9-11 and should be understood to be supported by description of the like reference numerals described above, unless specifically described otherwise below.

In the illustrated implementation of FIGS. 9-11, inner walls 290*a*, 290*b* of the first and second stops 280, 282 are substantially straight and transverse to the longitudinal axis L, forming a V-shape converging away from the attachment portion 256. A horizontal linear dimension H1 of the working edge 270 measured perpendicular to the longitudinal axis L in the plane of the blade 242 is about 1.0 inches (+/−0.125 inches), but may have other dimensions in other implementations. For example, the horizontal linear dimension H1 may be between 0.25 inches and 2 inches. The first and second stops 280, 282 are each generally triangular (specifically scalene triangles), as defined collectively by the distal end 268, the inner walls 290a, 290b, and the outer walls 292a, 292b, respectively. Other features of the blade 242 are as described above with respect to the blade 142.

In other implementations, the blade 242 may have other dimensions, other sizes, other shapes, etc.

FIGS. 12-14 illustrate a blade 342 according to another implementation of the disclosure. The blade 342 has the same material(s) and features of the blade 142 described above except where differences are specifically described below. As such, description of the blade 142 above applies to the blade 342 and, rather than duplicate description, reference is made to the description above. Like reference numerals plus "300" are employed with respect to FIGS. 12-14 and should be understood to be supported by description of the like reference numerals described above, unless specifically described otherwise below.

In the illustrated implementation of FIGS. 12-14, the working edge 370 is recessed from the distal end 368 by a distance D1 of about 0.05 inches (+/−0.025 inches). In other implementations, the distance D1 may be between 0.025 and 0.2 inches. In some implementations, the distance D1 may be at least 0.025 inches or may be at least 0.05 inches. In other embodiments, the distance D1 may be less than 0.2 inches, may be less than 0.1 inches, or may be less than 0.05 inches.

A horizontal linear dimension H1 of the working edge 370 measured perpendicular to the longitudinal axis L in the plane of the blade 342 is about 0.5 inches (+/−0.125 inches), but may have other dimensions in other implementations. For example, in some implementations, the horizontal linear dimension H1 may be between 0.25 inches and 2 inches. In some implementations, the horizontal linear dimension H1 may be at least 0.25 inches or may be at least 0.5 inches. In other implementations, the horizontal linear dimension may be less than 2 inches or less than 1 inch.

The distal end 168 has an overall width W2 of about 1.915 inches (+/−0.125 inches). The stop widths W3, W4 are about 0.71 inches (+/−0.125 inches) in the illustrated implementation, but may be between 0.1 inches and 1.25 inches in other implementations. In some implementations, the stop widths W3, W4 may be at least 0.1 inches, may be at least 0.2 inches, may be at least 0.3 inches, may be at least 0.4 inches, may be at least 0.5 inches, may be at least 0.6 inches, or may be at least 0.7 inches. In other implementations, the stop widths W3, W4 may be less than 1.25 inches, may be less than 1.0 inches, or may be less than 0.75 inches.

First and second inner walls 390a, 390b of the first and second stops 380, 382 are substantially straight. The first inner wall 390a is substantially parallel to the longitudinal axis L. The second inner wall 390b is transverse to the longitudinal axis L. In other implementations, the first and second inner walls 390a, 390b may have other configurations. Furthermore, outer walls 392a, 392b of the first and second stops 380, 382, respectively, are substantially straight and transverse to the longitudinal axis L. Specifically, the outer walls 392a, 392b are arranged in a V-shape with respect to each other converging towards the attachment portion 356. The outer walls 392a, 392b each include a longitudinal segment 396, respectively, extending substantially parallel to the longitudinal axis L and extending directly from the distal end 368. The first and second stops 380, 382 are each generally triangular (specifically right triangles), as defined collectively by the substantially straight edges 384a, 384b, the inner walls 390a, 390b, and the outer walls 392a, 392b, with a blunt outer corner defined by the longitudinal segment 396 respectively.

In other implementations, the blade 342 may have other dimensions, other sizes, other shapes, etc.

FIGS. 15-17 illustrate a blade 442 according to another implementation of the disclosure. The blade 442 has the same material(s) and features of the blade 142 described above except where differences are specifically described below. As such, description of the blade 142 above applies to the blade 442 and, rather than duplicate description, reference is made to the description above. Like reference numerals plus "400" are employed with respect to FIGS. 15-17 and should be understood to be supported by description of the like reference numerals described above, unless specifically described otherwise below.

The blade 442 includes a body 458 having a distal end 468 and a working edge 470 recessed from the distal end 468 between first and second stops 480, 482. The working edge 470 may also be referred to herein as a cutting edge 470. The first and second stops 480, 482 terminate at the distal end 468 generally opposite the attachment portion 456. In the illustrated implementation, the first and second stops 480, 482 each include a substantially straight edge 484a, 484b, respectively, at the distal end 468, though in other implementations the first and second stops 480, 482 may each include other types of edges at the distal end 468, such as a curved edge, an angled edge, a point, etc. The substantially straight edges 484a, 484b include teeth 494 aligned linearly tip-to-tip, the teeth 494 having the same toothform as the teeth 472 described below. The substantially straight edges 484a, 484b are perpendicular to the longitudinal axis L. The working edge 470 is disposed between the distal end 468 and attachment portion 456 with respect to the longitudinal axis L. In the illustrated implementation of FIGS. 15-17, the working edge 470 is recessed from the distal end 468 by a distance D1 of about 0.146 inches (+/−0.125 inches). In other implementations, the distance D1 may be between 0.1 and 1.0 inches.

In the illustrated implementation of FIGS. 15-17, the working edge 470 has a V-shape recessed from the distal end 468, the V-shape being formed from two straight segments. The distance D1 is measured from the apex of the V-shape to the distal end 468. In other words, the distance D1 is a maximum distance of the working edge 470 from the distal end 468 (i.e., a distance from the distal end 468 to a point or area on the working edge 470 that is furthest from distal end 468). However, in other implementations, the working edge 470 may be U-shaped or generally in any recessed shape formed from any combination of straight and/or curved segment(s). In the illustrated implementation, the working edge 470 is toothed, e.g., includes teeth 472. The tooth density of the teeth 472 is 17 teeth per inch, but in other implementations the tooth density may be 14 to 24 teeth per inch. In the illustrated implementation, the teeth 472 each include a pointed tip 474 defined by a first edge 476 disposed substantially parallel to the longitudinal axis L and a second edge 478 disposed at an angle X1 of about 55 degrees with respect to the longitudinal axis L (+/−5 degrees). A height X2 of the teeth 472 is about 0.019 inches (+/−0.005 inches), and a gullet radius R1 between each of the teeth 472 is about 0.012 (+/−0.005 inches). In other implementations, the first working edge 470 may include other types and configurations of teeth, and in yet other implementations the first working edge 470 may include other types of cutting surfaces, grinding surfaces, sanding surfaces, smoothing surfaces, etc.

Adjacent pointed tips 474 of the teeth 472 defining the working edge 470 are arranged with respect to each other in the V-shape. A horizontal linear dimension H1 of the working edge 470 measured perpendicular to the longitudinal axis L in the plane of the blade 442 is about 0.60 inches (+/−0.125 inches), but may have other dimensions in other implementations. For example, in some implementations, the horizontal linear dimension H1 may be between 0.20 inches and 2 inches. In some implementations, the horizontal linear dimension H1 may be at least 0.2 inches, may be at least 0.3 inches, may be at least 0.4 inches, may be at least 0.5 inches, or may be at least 0.6 inches. In other implementations, the horizontal linear dimension H1 may be less than 2 inches, may be less than 1.5 inches, or may be less than 1.0 inches.

Thus, in the illustrated implementation of FIGS. 15-17, the distal end 468 and the working edge 470 are continuously toothed along a substantially straight line having a V-shaped recess therein. The V-shaped recess may more generally be referred to as a toothed notch and may have other shapes.

In the illustrated implementation of FIGS. 15-17, the blade 442 includes substantially parallel linear side edges 486a, 486b extending generally parallel to the longitudinal axis L. A width W1 between the side edges 486a, 486b is about 1.49 inches (+/−0.125 inches). In other implementations, the width W1 may be between 0.6 and 3 inches. The distal end 468 has an overall width W2 of about 1.865 inches (+/−0.125 inches).

The first and second stops 480, 482 each include a stop width W3, W4, respectively. The stop widths W3, W4 are about 0.63 inches (+/−0.125 inches) in the illustrated implementation, but may be between 0.1 inches and 1.25 inches in other implementations. In some implementations, the stop widths W3, W4 may be at least 0.1 inches, may be at least 0.2 inches, may be at least 0.3 inches, may be at least 0.4 inches, may be at least 0.5 inches, or may be at least 0.6 inches. In other implementations, the stop widths W3, W4 may be less than 1.25 inches, may be less than 1.0 inches, or may be less than 0.75 inches. The stop widths W3, W4 are substantially the same as each other in the illustrated implementation, but may be different from each other in other implementations. Furthermore, outer walls 492a, 492b of the first and second stops 480, 482 are substantially straight and substantially transverse to the longitudinal axis L. Specifically, the outer walls 492a, 492b are arranged in a V-shape with respect to each other converging towards the attachment portion 456. The outer walls 492a, 492b each include a longitudinal segment 496, respectively, extending substantially parallel to the longitudinal axis L and extending directly from the distal end 468.

With reference to FIG. 16, a length Y of the blade 442 measured parallel to the longitudinal axis L is about 3.470 inches (+/−0.125 inches). In other implementations, the length Y may be between 2 inches and 5 inches, and more specifically between 3 inches and 4 inches.

In other implementations, the blade 442 may have other dimensions, other sizes, other shapes, etc.

FIGS. 18-20 illustrate a blade 542 according to another implementation of the disclosure. The blade 542 has the same material(s) and features of the blade 42 described above except where differences are specifically described below. As such, description of the blade 42 above applies to the blade 542 and, rather than duplicate description, reference is made to the description above. Like reference numerals plus "500" are employed with respect to FIGS. 18-20 and should be understood to be supported by description of the like reference numerals described above, unless specifically described otherwise below.

The body 558 includes a distal end 568 defined by first and second stops 580, 582, and a working edge 570 recessed between the first and second stops 580, 582. The working edge 570 may also be referred to herein as a cutting edge 570. The first and second stops 580, 582 terminate at the distal end 568 generally opposite the attachment portion 556. In the illustrated implementation, the first and second stops 580, 582 each include a substantially straight edge 584a, 584b, respectively, at the distal end 568, though in other implementations the first and second stops 580, 582 may each include other types of edges at the distal end 568, such as a curved edge, an angled edge, a point, etc. The substantially straight edges 584a, 584b are generally parallel with the working edge 570, and are generally perpendicular to the longitudinal axis L. The substantially straight edges 584a, 584b are toothless in the illustrated implementation, but may have teeth in other implementations. The working edge 570 is disposed between the distal end 568 and attachment portion 556 with respect to the longitudinal axis L. In the illustrated implementation of FIGS. 18-20, the working edge 570 is recessed from the distal end 568 by a distance D1 of about 0.25 inches (+/−0.125 inches). The distance D1 can also be described as the offset between the working edge 570 and the straight edges 584a, 584b. In other implementations, the distance D1 may be between 0.125 and 1.0 inches. In some implementations, the distance D1 may be at least 0.124 inches or may be at least 0.25 inches. In other implementations, the distance D1 may be less than 1.0 inches, may be less than 0.5 inches, or may be less than 0.25 inches. The working edge 570 may be formed from bimetal, carbide, or the like, or any combination thereof, and may be formed from the same or different type of material as the rest of the blade 542.

In the illustrated implementation of FIGS. 18-20, the first and second stops 580, 582 and the working edge 570 are generally symmetrical about the longitudinal axis L (not taking the toothform into consideration for symmetry). Other implementations need not be symmetrical. In the illustrated implementation, the working edge 570 is disposed substantially perpendicularly to the longitudinal axis L. However, in other implementations, the working edge 570 may have other orientations with respect to the longitudinal axis L. For example, the working edge 570 may be generally transverse (i.e., non-parallel) to the longitudinal axis L, which may include substantially perpendicular, angled, etc. Also in other implementations, the working edge 570 need not be straight and may be curved. In the illustrated implementation, the working edge 570 is toothed, e.g., includes teeth 572. The tooth density of the teeth 572 is 18 teeth per inch, but in other implementations the tooth density may be 14 to 24 teeth per inch. Generally, there should be at least three teeth 572 engaging the object being cut. Another way of expressing TPI is through the pitch P, which is the distance between teeth 572 when the teeth are uniform. The minimum pitch (Pmin) can be calculated by the radial distance R multiplied by the angular distance $\ominus$ times pi divided by 540 (Pmin=R$\ominus$π/540), where the radial distance R is measured from the anchor center C to the working edge 570, and where the angular distance $\ominus$ is measured between opposite ends of the working edge 570 with the anchor center C as the angular center. In the illustrated implementation, the teeth 572 each include a pointed tip 574 defined by a first edge 576 disposed substantially parallel to the longitudinal axis L and a second edge 578 disposed at an angle X1 of about 55 degrees with respect to the longitudinal axis L (+/−5 degrees). A height X2 of the teeth 72 is about 0.016 inches (+/−0.005 inches) measured from the center of the gullet to the pointed tip 574, or about 0.0275 inches (+/−0.005 inches) measured from the bottom of the gullet to the pointed tip 574, as shown. A gullet radius R1 between each of the teeth 572 is about 0.012 (+/−0.005 inches) measured from an edge of the gullet edge to the gullet center. In other implementations, the first working edge 570 may include other types and configurations of teeth, such as other rake and relief style teeth, triangular teeth, etc. And in yet other implementations, the first working edge 570 may include other types of cutting surfaces, grinding surfaces, sanding surfaces, smoothing surfaces, etc.

In the illustrated implementation of FIGS. 18-20, the working edge 570 is substantially linear. More specifically, the pointed tips 574 of the teeth 572 defining the working edge 570 are arranged substantially linearly. A horizontal linear dimension H1 of the working edge 570 measured perpendicular to the longitudinal axis L in the plane of the blade 542 is about 0.662 inches (+/−0.125 inches), but may have other dimensions in other implementations. For example, in some implementations, the horizontal linear dimension H1 may be between 0.25 inches and 2 inches. In some implementations, the horizontal linear dimension H1 may be at least 0.25 inches or may be at least 0.5 inches. In other implementations, the horizontal linear dimension H1 may be less than 2 inches, may be less than 1 inch, or may be less than 0.75 inches.

In the illustrated implementation of FIGS. 18-20, the blade 542 includes substantially parallel linear side edges 586a, 586b extending generally parallel to the longitudinal axis L. A width W1 between the side edges 586a, 586b is about 1.490 inches (+/−0.125 inches). In other implementations, the width W1 may be between 0.6 and 3 inches. The blade 542 includes stepped side edges 588a, 588b disposed on the body 558 between the working edge 570 and the attachment portion 556. The side edges 588a, 588b are stepped in from the side edges 586a, 586b by a distance D2 of about 0.125 inches (+/−0.05 inches). In other implementations, the distance D2 may be between 0.005 and 0.4 inches, and in yet other implementations the stepped side edges need not be included. The side edges 588a, 588b are disposed between the attachment portion 556 and the first and second stops 580, 582. Outer walls 592a, 592b of the first and second stops 580, 582 at the distal end 568 are stepped in from the side edges 588a, 588b by a distance D3 of about 0.089 inches (+/−0.005 inches). Overall, the outer walls 592a, 592b are stepped in from the attachment portion 556 by a distance D4 of about 0.214 inches (+/−0.125 inches). The distal end 568 has an overall width W2 of about 1.062 inches (+/−0.125 inches). In other implementations, the overall width W2 may be between 0.5 and 1.3 inches, or more specifically may be between 0.75 and 1.25 inches.

The first and second stops 580, 582 each include a stop width W3, W4, respectively. The stop widths W3, W4 are about 0.2 inches (+/−0.125 inches) in the illustrated implementation, but may be between 0.075 inches and 0.5 inches in other implementations. In some implementations, the stop widths W3, W4 may be at least 0.75 inches, may be at least 0.1 inches, or may be at least 0.2 inches. In other implementations, the stop widths W3, W4 may be less than 0.5 inches, may be less than 0.4 inches, may be less than 0.3 inches, or may be less than 0.2 inches. The stop widths W3, W4 are substantially the same as each other in the illustrated implementation, but may be different from each other in other implementations. Inner walls 590a, 590b of the first and second stops 580, 582 are substantially straight and parallel to the longitudinal axis L. The inner walls 590a, 590b are toothless and separate the working edge 570 from the distal end 568 such that the working edge 570 is disjointed from the substantially straight edges 584a, 584b. In other implementations, the inner walls 590a, 590b may have teeth. Furthermore, the outer walls 592a, 592b of the first and second stops 580, 582 are substantially straight and parallel to the longitudinal axis L. The outer walls 592a, 592b are farther from the longitudinal axis L than the inner walls 590a, 590b. The first and second stops 580, 582 are each generally rectangular, as defined collectively by the substantially straight edges 584a, 584b, the inner walls 590a, 590b, and the outer walls 592a, 592b, respectively. In other implementations, the inner walls 590a, 590b and the outer walls 592a, 592b need not be parallel and may be transverse (non-parallel) to the longitudinal axis L, or any combination of parallel and transverse. Furthermore, in other implementations, the inner walls 590a, 590b and the outer walls 592a, 592b need not be straight and may be curved, or any combination of straight and curved.

With reference to FIG. 19, a length Y of the blade 542 measured parallel to the longitudinal axis L is about 3.969 inches (+/−0.125 inches). In other implementations, the length Y may be between 2 inches and 6 inches, and more specifically between 3.5 inches and 4.5 inches.

In other implementations, the blade 542 may have other dimensions, other sizes, other shapes, etc.

In operation, an operator attaches the blade 42 to the accessory holder 36 of the power tool 10. The operator grips the grip portion 22, actuates the power actuator 28 to oscillate the blade 42, and makes a cut in the workpiece (not shown) using the working edge 70. For example, the workpiece may include a fastener (such as a bolt, a screw, a nail, etc.), a small-diameter pipe, a small-diameter tube, or any other similarly shaped (e.g., small-diameter rounded profile) object that fits within the horizontal linear dimension W1 of the working edge 70. The first and second stops 80, 82 projecting from (or flanking) both sides of the working edge 70 inhibit the blade 42 from easily disengaging the workpiece being cut. The same operation applies to the blades 142, 242, 342, and 542 shown in FIGS. 6-14 and 18-20 with respect to the like parts numbered with like numerals (e.g., the working edges 170, 270, 370, 570, the first stops 180, 280, 380, 580, the second stops 182, 282, 382, 582 and so on). However, with respect to the blades 142, 242, and 342, the toothed distal end 168, 268, 368 may also be used to cut a workpiece.

With respect to the blade 442 in FIGS. 15-17, in operation, an operator attaches the blade 442 to the accessory holder 36 of the power tool 10. The operator grips the grip portion 22, actuates the power actuator 28 to oscillate the blade 442, and makes a cut in the workpiece (not shown) using the working edge 470. For example, the workpiece may include a fastener (such as a bolt, a screw, a nail, etc.), a small-diameter pipe, a small-diameter tube, or any other similarly shaped (e.g., small-diameter rounded profile) object that fits within the horizontal linear dimension W1 of the working edge 470. The working edge 470 is formed as a notch to receive the workpiece therein. The working edge 470 (or toothed notch), which may be V-shaped (or another recessed shape), encourages the workpiece to remain within the recessed working edge 470 during the cutting operation and thus inhibits the blade 442 from easily disengaging the workpiece being cut.

Thus, the disclosure provides, among other things, a blade having a recessed working edge for cutting a workpiece, especially a small-diameter rounded profile object, and for encouraging continuous engagement with the workpiece. Although the disclosure has been described in detail with reference to certain preferred implementations, variations and modifications exist within the scope and spirit of one or more independent aspects of the disclosure as described. Various features and advantages of the disclosure are set forth in the following claims.

What is claimed is:

1. A blade comprising:
an attachment portion configured to couple with an oscillating power tool;
a body extending from the attachment portion in a direction defining a longitudinal axis, the body defining a distal end generally opposite the attachment portion, the body having a generally planar portion defining a plane, the generally planar portion including a cutting edge having teeth, wherein the cutting edge and the distal end are in the plane, wherein the cutting edge is recessed from the distal end such that the cutting edge is closer to the attachment portion than the distal end is to the attachment portion, and wherein the body defines inner walls extending from the cutting edge to the distal end.

2. The blade of claim 1, wherein the distal end is toothless.

3. The blade of claim 1, wherein at least one of the inner walls is substantially parallel with the longitudinal axis.

4. The blade of claim 1, wherein the cutting edge extends generally perpendicular to the longitudinal axis.

5. The blade of claim 1, wherein the distal end is defined by a first stop on one side of the longitudinal axis and a second stop on an opposite side of the longitudinal axis, wherein the first stop defines one of the inner walls, wherein the second stop defines another one of the inner walls, and wherein the first and second stops are configured to engage a workpiece.

6. The blade of claim 5, wherein the inner walls are in the plane, and wherein the cutting edge is recessed from the distal end in the direction of the longitudinal axis.

7. The blade of claim 6, wherein the inner wall of each of the first and second stops is toothless.

8. The blade of claim 5, wherein the first and second stops each include an outer wall extending from the distal end toward the attachment portion on an outer side of the body.

9. The blade of claim 8, wherein the outer wall of each of the first and second stops is toothless.

10. The blade of claim 1, wherein the generally planar portion is bounded by an upper planar surface and a lower planar surface, wherein the upper planar surface is parallel to the plane, wherein the lower planar surface is parallel to the plane, and wherein the cutting edge and the distal end are disposed between the upper planar surface and the lower planar surface.

11. The blade of claim 1, wherein the cutting edge and the distal end are side edges of the generally planar portion.

12. A blade comprising:
an attachment portion configured to couple with an oscillating power tool;
a body extending from the attachment portion in a forward direction defining a longitudinal axis, the body defining a distal end generally opposite the attachment portion, the body defining a first toothless wall and a second toothless wall, the body having a generally planar portion defining a plane, the generally planar portion including a cutting edge having teeth, wherein the cutting edge and the distal end are in the plane, wherein the teeth extend from a first end of the cutting edge to a second end of the cutting edge, wherein the first toothless wall extends in the forward direction from the first end of the cutting edge to the distal end and the second toothless wall extends in the forward direction from the second end of the cutting edge to the distal end.

13. The blade of claim 12, wherein the distal end is toothless.

14. The blade of claim 12, wherein at least one of the first or second toothless walls is substantially parallel with the longitudinal axis.

15. The blade of claim 12, wherein at least one of the first or second toothless walls is transverse to the longitudinal axis.

16. The blade of claim 12, wherein the cutting edge extends generally perpendicular to the longitudinal axis.

17. The blade of claim 12, wherein the first and second toothless walls are substantially mirror images of each other about the longitudinal axis.

18. A blade comprising:
an attachment portion configured to couple with an oscillating power tool;
a body extending from the attachment portion in a direction defining a longitudinal axis, the body defining a distal end generally opposite the attachment portion, the body having a generally planar portion defining a plane, the generally planar portion including a cutting edge having teeth, wherein the cutting edge and the distal end are in the plane, wherein the cutting edge is recessed from the distal end such that the body defines inner walls extending from the cutting edge to the distal end, and wherein the cutting edge extends generally perpendicular to the longitudinal axis.

19. The blade of claim 18, wherein the inner walls are toothless.

* * * * *